US006263366B1

(12) United States Patent
Jacobs et al.

(10) Patent No.: US 6,263,366 B1
(45) Date of Patent: *Jul. 17, 2001

(54) SYSTEM AND METHOD THEREFOR OF TRANSLATING A MESSAGE HAVING A GIVEN FORMAT FOR USAGE IN AN OPERATIONS SYSTEM

(75) Inventors: Andrew R. Jacobs; Paul L. Koch, both of Colorado Springs, CO (US)

(73) Assignee: MCI Communications Corporation, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/775,799

(22) Filed: Dec. 31, 1996

(51) Int. Cl.[7] ............... G06F 15/173; G06F 15/16; H04M 3/22
(52) U.S. Cl. .................. 709/223; 709/246; 379/32
(58) Field of Search ............... 395/200.53, 200.54, 395/200.76, 200.8; 370/241; 379/9, 32, 33; 709/223–224, 246, 250

(56) References Cited

U.S. PATENT DOCUMENTS

| | | |
|---|---|---|
| 4,947,421 | 8/1990 | Toy et al. . |
| 5,027,384 | 6/1991 | Morganstein . |
| 5,029,196 | 7/1991 | Morganstein . |
| 5,309,512 | 5/1994 | Blackmon et al. . |
| 5,317,742 * | 5/1994 | Bapat ........................... 395/680 |
| 5,452,433 * | 9/1995 | Nihart et al. ................. 395/500 |
| 5,608,720 * | 3/1997 | Biegel et al. ................. 370/249 |
| 5,613,100 * | 3/1997 | Anezaki ....................... 395/500 |
| 5,619,561 | 4/1997 | Reese . |
| 5,740,368 * | 4/1998 | Villalpando ................ 395/200.32 |
| 5,764,955 * | 6/1998 | Doolan ......................... 395/500 |
| 5,870,749 * | 2/1999 | Adusumilli ................. 707/101 |
| 5,892,950 * | 4/1999 | Rigori et al. ................ 717/5 |
| 5,991,814 * | 11/1999 | Rzonca et al. .............. 709/237 |
| 6,002,758 * | 12/1999 | Ely et al. ..................... 379/207 |
| 6,047,279 * | 4/2000 | Barrack et al. .............. 706/60 |
| 6,052,382 * | 4/2000 | Burke et al. ................ 370/466 |
| 6,055,243 * | 4/2000 | Vincent et al. .............. 370/466 |
| 6,085,255 * | 7/2000 | Vincent et al. .............. 709/238 |
| 6,105,061 * | 8/2000 | Nakai .......................... 709/223 |
| 6,138,272 * | 10/2000 | Tonouchi ..................... 717/5 |

FOREIGN PATENT DOCUMENTS

| | | |
|---|---|---|
| 0510411A2 | 10/1992 | (EP) . |
| 0691776A2 | 1/1996 | (EP) . |
| 0692901A2 | 1/1996 | (EP) . |
| 2240693A | 8/1991 | (GB) . |
| 01264048 | 10/1989 | (JP) . |
| 03280775 | 12/1990 | (JP) . |
| 04245841 | 9/1992 | (JP) . |
| 06070016 | 3/1994 | (JP) . |

OTHER PUBLICATIONS

Computer Dictionary, 2nd ed., Microsoft Press, pp. 335–336, 1994.*

Shen, Q., "The Construction of an Open INMS," IEEE TENCON '93, 1993 IEEE Region 10 Conf., pp. 689–692.*

"Secretarial Branch Exchange"—Zeheb, D.; IBM Technical Disclosure Bulletin, vol. 26, No. 5, pp. 2645–2647; Oct. 1983.

* cited by examiner

Primary Examiner—Zarni Maung
Assistant Examiner—Andrew Caldwell

(57) ABSTRACT

A system for mapping an incoming protocol message to an operations system protocol message employs data tables each linked relationally to other data tables. At least one of the data tables represents an autonomous message to event map listing incoming protocol messages and their corresponding operations system protocol messages, and at least another of the data tables represents a non-autonomous message to directive map listing incoming protocol messages and their corresponding operations system protocol messages.

9 Claims, 7 Drawing Sheets

| Message Parm. | Description | Used? | OSI/TeMIP® Event Argument | TeMIP® Dictionary Type |
|---|---|---|---|---|
| SID | Source Identifier. Used with AID to identify NE. | Yes | Managed Object {X.721} | FullEntityName |
| Date | Message origination date | No → | Explanation: This field is not currently used and does not appear in OSI alarms | |
| Time | Message origination time | No → | Explanation: This field is not currently used and does not appear in OSI alarms | |
| ALMCDE | Alarm code, indicates alarm severity | No → | Explanation: Duplicates NTFCNCDE, no incremental value | |
| ATAG | Automatic message tag | No → | Explanation: Closest analog in Q3 is NotificationID, but not useful here | |
| SCCM | Second Command Code Modifier. Specifies type of alarm. | No → | Explanation: No equivalent alarm grouping parameter in Q3 | |
| AID | Access identifier. Used with SID to identify NE. | Yes | Managed Object {X.721} | FullEntityName — See common TL1 encoding maps in Sect's 5.1 & 5.2 for AID/CONDDESCR to class mapping |
| NTFCNCDE | Notification code, indicates alarm severity | Yes | Perceived Severity {X.721} | See TL1 encoding map in Sect. 5.4 for this parm. |
| CONDTYPE | Specifies type of event | No → | Explanation: CONDDESCR field is used to identify probable cause. See common TL1 encoding map for AID/CONDDESCR | |
| SRVEFF | Service effect indication | Yes | Additional Information {X.721} alarmEffectOn ServiceParameter {M.3100} | See common TL1 encoding map in Section 5.5 for this parm. |
| OCRDAT | Event occurrence date | Yes | Event Time {X.721} | BinAbsTim |
| OCRTM | Event occurrence time | Yes | | |
| LOCN | Alarm location | No → | Explanation: Not used in Q3 and no application in SONM | |
| DIRN | Alarm direction | No → | Explanation: Not used in Q3 and partly redundant to AID field in Regen. alarms which implicitly identifies direction, i.e. 1- AE. 1-AW, 1-BE, 1-BW. | |
| CONDDESCR | Alarm text description | Yes | Additional Text {X.721} | Latin1String(64) |

FIG. 4

| Message Parm. /58 | Description /60 | Used? /62 | OSI/TeMIP® Event Argument /64 | TeMIP® Dictionary Type |
|---|---|---|---|---|
| SID | Source Identifier. Used with AID to identify NE. | Yes | AlarmSummaryData : Object Identifier {Q.821} | FullEntityName |
| Date | Message origination date | No → | *Explanation:* This field is not currently used and does not appear in OSI alarms | |
| Time | Message origination time | No → | *Explanation:* This field is not currently used and does not appear in OSI alarms | |
| SCCM | Second Command Code Modifier. Specifies type of alarm. | No → | *Explanation:* No equivalent alarm grouping parameter in Q3 | |
| TID | Target Identifier. | Yes | Managed Object {X.721} | FullEntityName |
| AID | Access Identifier. Used with SID to identify NE. | Yes | AlarmSummaryData : Object Identifier {Q.821} | FullEntityName |
| CTAG | Correlation Tag. Used to correlate non-autonomous command and response messages | No → | *Explanation:* Closest analog in Q3 is NotificationID, but not useful here | |
| NTFCNCDE | Notification code, indicates alarm severity | Yes | AlarmSummaryData : Perceived Severity {Q.821} | See TL1 encoding map in Sect. 5.4 for this parm. |
| CONDTYPE | Specifies type of event | No → | *Explanation:* CONDDESCR field is used to identify probable cause. See common TL1 encoding map for AID/CONDDESCR Note: Probable cause is placed in AlarmSummaryData : Probable Cause | |
| SRVEFF | Service effect indication | No → | *Explanation:* There is no equivalent cASC object attribute | |
| LOCN | Alarm location | No → | *Explanation:* There is no equivalent cASC object attribute | |
| DIRN | Alarm direction | No → | *Explanation:* There is no equivalent cASC object attribute | |
| AIDTYPE | Type of access identifier | No → | *Explanation:* No equivalent parameter in Q3 | |
| OCRDAT | Event occurrence date | Yes | Event Time {X.721} | BinAbsTim |
| OCRTM | Event occurrence time | Yes | | |
| CONDDESCR | Alarm text description | No → | *Explanation:* There is no equivalent cASC object attribute | |
| ERRCDE | Associated error code of the message | Yes | Errors | TBD |

FIG. 5

| Encoding | Meaning | Nortel Alarm Class. | CONDDESCR | SpecProb | Notif Type | P.C. | OSI Managed Object Class. |
|---|---|---|---|---|---|---|---|
| 5.1 | | | | | | | |
| 48 LTE and ADM | | | | | | | |
| ..16 | DS3 mapper circuit pack | DS3 equipment | Protection switch fail | 21 | Equip | 0 | circuitPack |
| | | DS3 equipment | Protection switch complete (automatic switch due to fault - TL1 message is REPT ALM) | 52 | Equip | 0 | circuitPack |
| | | DS3 equipment | Protection switch complete (response to manual switch to protection - TL1 message is REPT EVT) | 52 | Protect | n/a | protectionGroup (see Note 3) |
| | | DS3 equipment | Protection path fail | 105 | Equip | 60 | circuitPack |
| | | DS3 equipment | Forced switch request | 901 | Equip | 100 | circuitPack |
| | | DS3 equipment | Lockout request | 902 | Equip | 100 | circuitPack |
| | | DS3 equipment | Manual switch request | 903 | Equip | 100 | circuitPack |

FIG. 6

5.2 CONDEFF

| TL1 Message: REPT ALM ENV Parameter: CONDEFF | | OSI/TeMIP® Event Argument: Perceived Severity ASN.1 Type: PerceivedSeverity {X.721} | |
|---|---|---|---|
| Encoding | Meaning | ASN.1 Type Definition | TeMIP® Dictionary Type |
| TC | Transient condition | ENUM indeterminate (0) | BIDT ENUMERATION |
| SC | Standing Condition | ENUM warning (4) | BIDT ENUMERATION |
| CL | Clear standing Condition | ENUM cleared (5) | BIDT ENUMERATION |

5.3 NFTCNCDE

| TL1 Message: REPT ALM, REPT ALM ENV Parameter: NFTCNCDE | | OSI/TeMIP® Event Argument: Perceived Severity ASN.1 Type: PerceivedSeverity {X.721} | |
|---|---|---|---|
| Encoding | Meaning | ASN.1 Type Definition | TeMIP® Dictionary Type |
| CR | Critical Alarm | ENUM critical (1) | BIDT ENUMERATION |
| MJ | Major Alarm | ENUM major (2) | BIDT ENUMERATION |
| MN | Minor Alarm | ENUM minor (3) | BIDT ENUMERATION |
| CL | Cleared Alarm | ENUM cleared (5) | BIDT ENUMERATION |
|  | n/a | ENUM indeterminate (0) | BIDT ENUMERATION |
|  | n/a | ENUM warning (4) | BIDT ENUMERATION |
| 92 | 94 | 96 | 98 |

5.4 SRVEFF

| TL1 Message: REPT ALM Parameter: SRVEFF | | OSI/TeMIP® Event Argument: Additional Information alarmEffectOnServiceParameter {M.3100} ASN.1 Type=Boolean | |
|---|---|---|---|
| Encoding | Meaning | ASN.1 Type Definition | TeMIP® Dictionary Type |
| SA | Service Affecting | TRUE | Boolean |
| NSA | Non-Service Affecting | FALSE | Boolean |

FIG. 7

SYSTEM AND METHOD THEREFOR OF TRANSLATING A MESSAGE HAVING A GIVEN FORMAT FOR USAGE IN AN OPERATIONS SYSTEM

FIELD OF THE INVENTION

The present invention relates to message transmission in a telecommunications network and more particularly to the translation of a message having a given protocol to a counterpart message usable in a system operating under a different protocol.

BACKGROUND OF THE INVENTION

A synchronous optical network (SONET) provides the flexibility needed to transport digital signals with different capacities in a telecommunications network. A SONET network also provides a standard from which different manufacturers can base the design of their equipment. Thus, a SONET optical interface standard allows the interworking of transmission products from multiple vendors, as it defines the physical interface, the optical line rates known as optical carrier (OC) signals, frame format and the OAM&P (operations, administration, maintenance, and provisioning) protocol. In order to develop a standards compliant operations system (OS) to manage a SONET network, a management information model based upon well known international telecommunications standards must be developed so that the network may be managed in a standards-based environment. However, at the present time there are limited standards-based interfaces, such as Q3 interfaces, to the vendor network elements (NEs). Accordingly, some "bridge-the-gap" solution has to be found to enable the newly developed OS to utilize existing communications language whose operating protocol is different from that of the OS.

SUMMARY OF THE INVENTION

To communicate with the network elements (NEs) of the SONET network in an environment of mixed management protocols, the operations system of the instant invention must be able to receive, transmit, and translate messages which operate under a different protocol than is used internally. To achieve this end, an access module is provided at the front end of the operations system to receive the messages incoming from the SONET network. The incoming messages are assumed to be Transaction Language 1 (TL1) messages, while the operations system utilizes internal messages that have a different protocol, in this instance a common management information protocol (CMIP), which is typically used to exchange information between two management stations.

To translate an incoming TL1 message into a message which is usable by the operations system, the TL1 access module (TL1 AM) provided at the front end of the operations system has a mapper/parser processing module that parses and maps autonomous and non-autonomous TL1 messages into respective equivalent interface alarms and events messages for use in the operations system. To perform the mapping and parsing, the mapper/parser module retrieves one of the data/mapping tables from a plurality of data tables stored in a memory store. The objects from the table are retrieved by the mapper/parser module and are used for mapping a message based on the incoming message, in this case an OSI message, to be used in the operations system.

It is therefore an objective of the present invention to provide a system and method therefor of translating an incoming message having a given operating protocol to a counterpart message having a different operating protocol which is usable in the operations system.

It is another objective of the present invention to provide an access module that has mapping and parsing capabilities for parsing an incoming message, and specifically the different fields of the message, so that a counterpart message may be mapped with corresponding fields from a data or mapping table retrieved from a data store.

BRIEF DESCRIPTION OF THE FIGURES

The above-mentioned objectives and advantages of the present invention will become apparent and the invention itself will be best understood by reference to the following description of an embodiment of the invention taken in conjunction with the accompanying drawings, wherein:

FIG. 4 is an exemplar data table that provides the translation map for mapping incoming autonomous messages having a given protocol to counterpart messages having a different protocol usable in the operations system of the instant invention;

FIG. 5 is an exemplar data map providing for the translation of non-autonomous messages having a given protocol to counterpart messages that have a protocol usable in the operations system of the instant invention; and FIGS. 6 and 7 are exemplar encoding mapping tables to be used for the instant invention.

DETAILED DESCRIPTION OF THE PRESENT INVENTION

Figure 1:
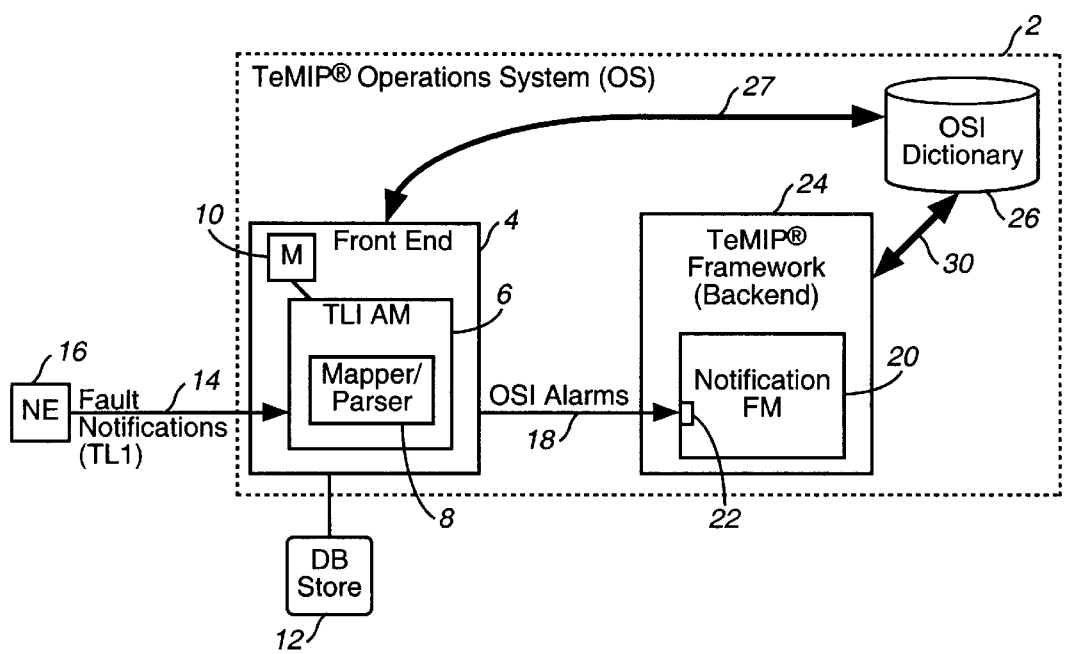
FIG. 1 is a simplified block diagram of the system of the present invention.

With reference to FIG. 1, the system of the present invention is shown to operate in an operations system (OS), for example a TeMIP® operations system of the Digital Equipment Corporation. As shown, operating within the TeMIP® operations system 2 is a front end module 4 which may comprise one or more conventional processors. Inside front end module 4 there resides a Transaction Language 1 access module (TL1 AM) 6. Within TL1 AM 6 is a mapper/parser module 8 that has connected thereto a memory store 10. Further connected to front end module 4 is a database store 12 which may be external of TeMIP® operations system 2. Not meant to be limiting to such, physically, front end module 4 may comprise a rack to which is inserted a TL1 AM integrated circuit card 6. Further, mapper/parser module 8 may comprise the same processor as front end module 4, or a software module whose operation is described below with respect to FIG. 3.

Albeit front end module 4 may have a number of inputs thereto and outputs therefrom, for the sake of simplicity and the pertinency of the instant invention, only one input 14 is shown to be provided to front end module 4 and specifically to TL1 AM 6 therein. Input 14, as shown in FIG. 1, is deemed to be fault notifications or messages that are transmitted from a network element (NE) 16. NE 16 may be any element that is within the telecommunications network. In the case that the instant invention resides in a synchronous optical network (SONET), NE 16 could be a add drop multiplexer (ADM), a lightwave regenerating equipment (LRE) or a line terminating equipment (LTE), etc. In any event, any notification from NE 16 to TL1 AM 6 is in the form of a message having a TL1 protocol.

TL1 AM 6 is further shown in FIG. 1 to have an output 18 from which notifications or messages such as alarm messages that are based on the open systems interconnection (OSI) standard are output. Via line 18, the output message from TL1 AM 6 is provided to a notification function module (FM) 20, and more specifically to a queue or buffer 22 in notification FM 20, which in turn resides in the back end 24 of the TeMIP® framework of operations system 2. For the exemplar TeMIP® OS 2, the messages or notifications that traverse therein are assumed to have an open systems interconnection (OSI) operating protocol, which allows equipment from different manufacturers to communicate. An OSI dictionary store 26—which may be referred to as a management information base (MIB)—is also provided in the TeMIP® OS 2 and is shown to be connected bidirectionally via connections 27 and 30 to front end module 4 and back end module 24, respectively. OSI dictionary 26 has stored therein all of the OSI information that is needed for the structuring of the OSI messages or notifications that traverse from front end module 4 to back end module 24. Such structuring of the OSI messages include providing specific values, probable cause, event types and other attributes that are needed for mapping each of the OSI messages, as will be discussed below with respect to the mapping process of the instant invention. Putting it simply, OSI dictionary 26 contains the standard under which the OSI messages are based.

In a conventional SONET telecommunications system, communication is effected by messages that operate under the TL1 management or operating protocol. However, some vendors have operations system that are not TL1 protocol based. With the instant invention system, an incoming notification having a TL1 operating protocol can be translated into a corresponding or counterpart message having the operating protocol of the vendor's operations system which, for this discussion, is deemed to be based on the OSI protocol.

Figure 2:
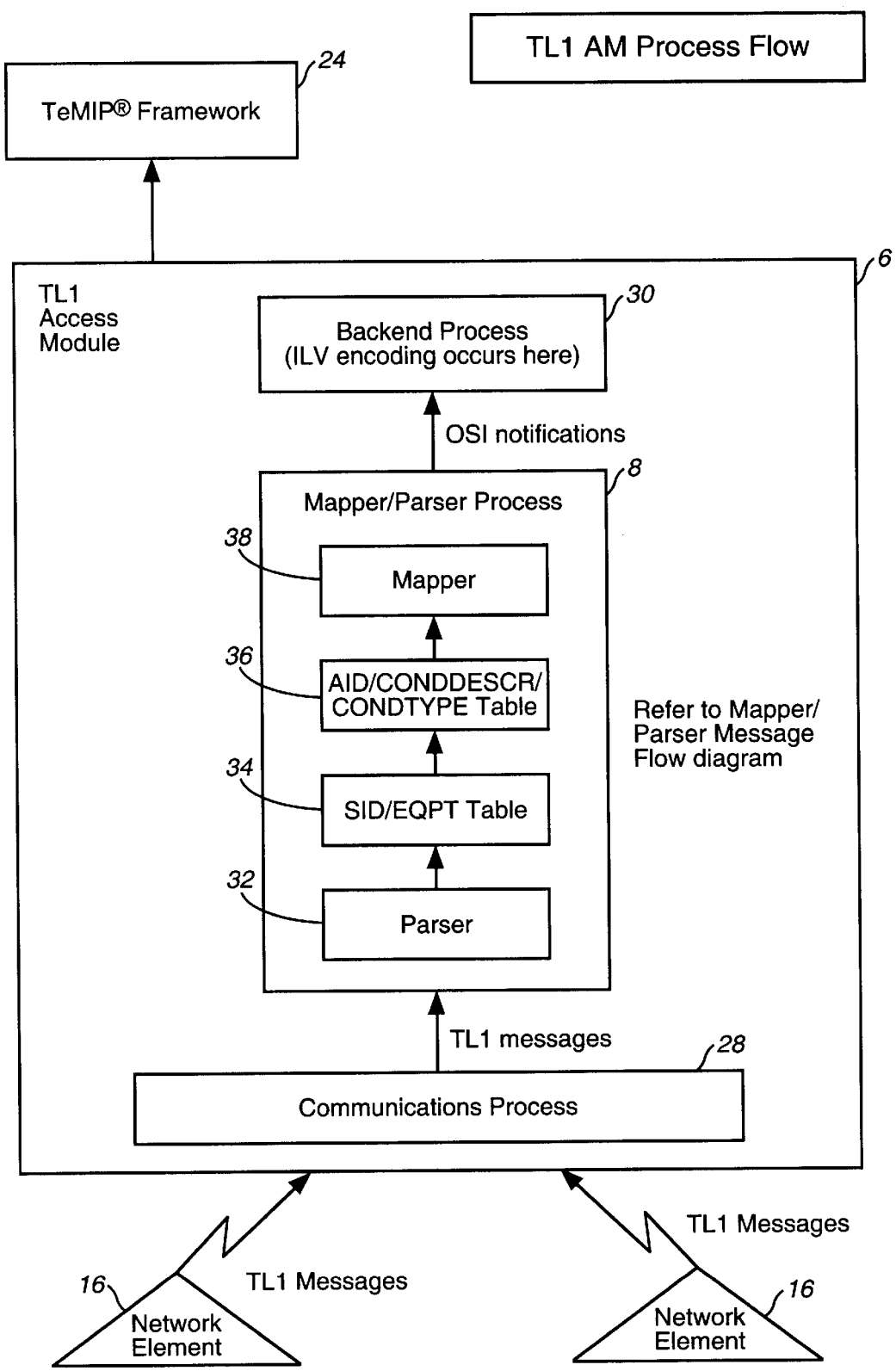
FIG. 2 is a block diagram focusing on the different processes that occur in the access module of the present invention as shown in FIG. 1.
Figure 3:
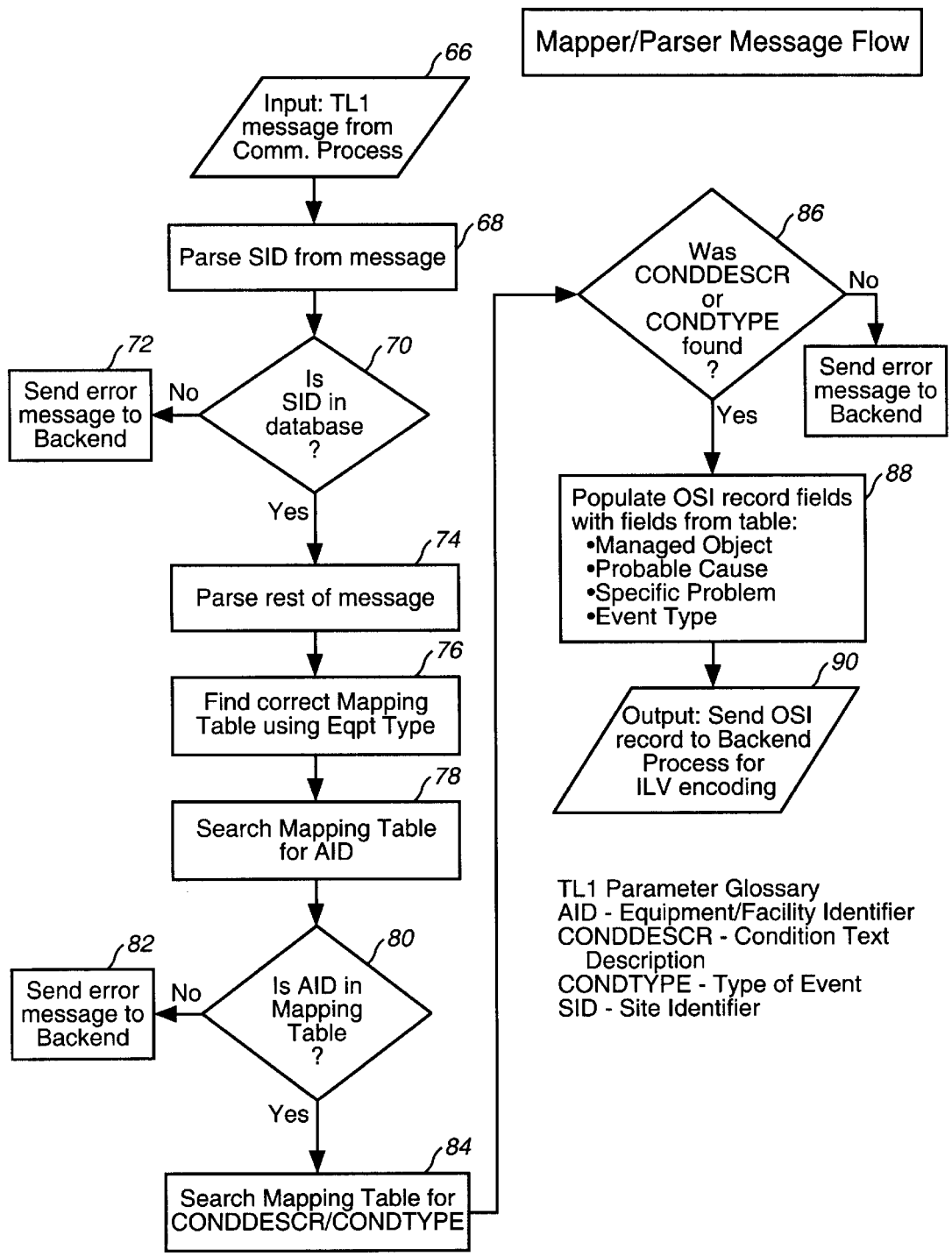
FIG. 3 is a flow diagram that illustrates the method of the instant invention.

To provide such translation, as best illustrated in FIG. 2 and the flow chart of FIG. 3, a combination parsing and mapping process is performed. In particular, with respect to FIG. 2, the TL1 access module 6 is shown to include 3 process modules, namely a mapper/parser process module 8, a communications process module 28 and a back end process module 30. The respective processes performed in each of mapper/parse process module 8, communications process module 28 and back end process module 30 could be performed by the same processor or different processors. As shown, TL1 messages are input to TL1 access module 6 by network elements 16. The interfacing that occurs between TL1 access module 6 and network elements 16 is performed by communications process module 28 in a conventional manner. Upon receipt, each TL1 message is forwarded to mapper/parser process module 8.

As shown in FIG. 2, there are four components or submodules within mapper/parser process module 8. They are: a parser submodule 32, a site identifier/equipment (SID/EQPT) memory store 34 in which at least one SID/EQPT data table is stored, a equipment/facility identifier/condition text description/type of event (AID/CONDDESCR/CONDTYPE) memory store 36 in which a AID/CONDDESCR/CONDTYPE table is stored, and a mapper process submodule 38. For the instant invention, note that even though SID/EQPT store 34 and AID/CONDDESCR/CONDTYPE store 36 are shown to be within mapper/parser process module 8, in practice, stores 34 and 36 may in fact be a part of memory store 10, shown in FIG. 1 to be part of TL1 access module 6 but external of mapper/parser module 8. Furthermore, although only one SID/EQPT table and one AID/CONDDESCR/CONDTYPE table are shown to reside in mapper/parser process module 8, there may in actuality be a plurality of those data tables, each being different and linked relationally to other data mapping tables, stored in memory store 10. These data mapping tables each are to be used in the mapping process whereby a corresponding TL1 message input to mapper/parser process module 8 is translated or mapped into a counterpart OSI output message.

Further shown in TL1 access module 6 is back end process module 30 to which the OSI messages from mapper/parser process module 8 are input. These OSI messages are further encoded into a specific protocol, in this instance an identifier length value (ILV) protocol used by the internal components within TeMIP® operations system 2. As further shown in FIG. 2, the OSI message, after translation, is provided to the TeMIP® framework 24, or more precisely buffer 22 of notification function module 20 thereat.

Exemplar mapping tables that are stored in memory store 10 and which are retrieved into stores 34 and 36 of mapper/parser process module 8 are shown in FIGS. 4, 5, 6 and 7. To elaborate, FIG. 4 is an illustration of an exemplar autonomous message to event map that may be stored in memory store 10. As shown, column 40, entitled "Message Parameter", provides a number of types of TL1 message parameters such as SID (site identifier) at 42, AID (equipment/facility identifier) at 44, NTFCNCDE (notification code) at 46, CONDTYPE (condition type) at 48 and CONDDESCR (condition of text description) at 50, among others. Column 50 provides the description for each of the corresponding messages listed in column 40. For example SID is described to be the source identifier and is used with AID to identify the node element. Similarly, AID is the access identifier and is used with SID to identify the node element. The third column in the autonomous mapping table of FIG. 4, designated 54, contains data that indicates whether the specific TL1 message is to be used when a counterpart OSI message is to be mapped therefrom. For example, going down column 54, it can be seen that message parameters SID, AID, NTFCNCDE, SRVEFF, OCRDAT, OCRTM, LOCN, DIRN and CONDDESCR are the parameters that can be mapped into corresponding fields of a counterpart OSI message, as indicated in column 56. For those message parameters that are indicated not being used, respective explanations are provided in why those message parameters are not being used. For example, the TL1 message parameter "Date" is not used in mapping a TL1 message into a counterpart OSI message because the corresponding field in the counterpart OS1 message is not used and will not appear in the OS1 message, which for this instance may be an alarm. Note that the autonomous map of FIG. 4 is used for mapping TL1 messages that are provided automatically and/or periodically to front end 4 of the operations system 2 without having been explicitly requested by the manager of the system. Such autonomous messages include notifications such as fault alarms that are transmitted asynchronously to the operations system 2.

The second type of exemplar data mapping table that is used by mapper/parser process module 8 is the non-autonomous exemplar mapping table illustrated in FIG. 5. Note that most of the message parameters in the FIG. 5 non-autonomous mapping table have the same designations as those shown in column 40 of the FIG. 4 mapping table.

For example, column 58 of FIG. 5 shows a number of message parameters including SID, AID, NTFCNCDE, CONDTYPE, SRVEFF, OCRDAT, OCRTM and CONDDESCR all of which have correspondence in the FIG. 4 table. Column 60 of the FIG. 5 mapping table, similar to the description column 52 of the FIG. 4 table, provides descriptive identification of the respective message parameters. Column 62 of the FIG. 5 table similarly indicate which of the message parameters listed under column 58 have corresponding OSI arguments for mapping. However, note that the OSI arguments for the corresponding TL1 message parameters identified in column 64 are different from the respective OSI arguments listed in column 60 for the same message parameters in the FIG. 4 mapping table. For example, for the message parameter SID, the corresponding OSI argument in the non-autonomous mapping table is Alarm Summary Data: Object Identifier. In contrast, for the autonomous mapping table of FIG. 4, the corresponding OSI argument is message parameter SID Managed Object.

Assume that a plurality of mapping tables similar to those of FIGS. 4 and 5 are stored as files in database (DB) store 12 external to the TeMIP® operations system 2. In operation, upon receipt of a TL1 message from network element 16, the appropriate file is retrieved from DB store 12 by mapper/parser process module 8 as a mapping data table. The operation of the method of the instant invention then proceeds as follows, with reference to FIG. 3.

As shown in step 66, a TL1 message is provided to communications process module 28 and is output thereby to mapper/parser process module 8. This TL1 message, as is well known, comprises a number of data fields. At step 68, the incoming TL1 message is parsed by parser submodule 32 to determine a given field, for example the first field that contains the SID, from the message. Next, a determination is made in step 70 on whether the SID is in database store 12. If it is not, an error message is provided to back end process module 30, per step 72, and the operation of the inventive process stops. If the SID indeed is found in the database, the remainder fields of the message are parsed, per step 74. From this parsing of the appropriate fields of the message, the correct mapping table is located from database store 12 and retrieved to mapper/parser process module 8, per step 76. The mapping table is then searched to locate the access identifier AID per step 78. If the AID is not found in the mapping table, per step 80, an error message is sent to back end process module 30 and the process stops, per step 82. If the access identifier AID is located in the mapping table, then, per step 84, the mapping table is searched to locate the appropriate condition text description and/or type of event. If neither of those message parameters is found per step 86, an error message is sent to back end process module 30 and the method of the instant invention stops. If either of those message parameters is found, the process proceeds to step 88.

For the example mapping table of FIG. 4, assuming that the input TL1 message is an autonomous message, the alarm text description parameter CONDDESCR (or the type of event message parameter CONDTYPE depending on the equipment type) is found at 50 and shown at FIG. 6. Thus, according to step 88, the corresponding fields of the counterpart OSI message are mapped by mapper submodule 28 using the corresponding OSI arguments of column 56 of the FIG. 4 mapping table to map the counterpart OSI message. For example, if the TL1 message has the message parameter NTFCNCDE, which is the notification code that indicates the severity of the alarm, a corresponding OSI argument identified in column 56 as the "perceived severity" is provided for mapping the counterpart OSI message. The encoding map referred to by the "perceived severity" argument is shown in section 5.4 of the FIG. 7 encoding map. There, it can be seen that for each level of alarm for the TL1 message, identified in columns 92 and 94 of the 5.4 NFTCNCDE encoding map of FIG. 7, corresponding OSI type perceived severity definitions are provided in column 96. The standard corresponding to the OSI definition from the OSI dictionary are provided in column 98.

Each field of the incoming TL1 message is parsed and mapped. Accordingly, a counterpart OSI message or object message that corresponds to the TL1 message but with an OSI operating protocol is generated as a result of step 88. This OSI message is output as an OSI notification, message or record to back end process module 30. There, for internal operation, this OSI message is encoded into a ILV protocol message for the internal use of the TeMIP® operations system. As shown in step 88, the four alarm/clearance correlation fields of the counterpart OSI message are the Managed Object, Probable Cause, Specific Problem and Event Type. Examples of these four types of objects are shown as maps 5.1 to 5.4 in FIGS. 6 and 7.

While a preferred embodiment of the present invention is disclosed herein for purposes of explanation, numerous changes, modifications, variations, substitutions and equivalents, in whole or in part, should now be apparent to those skilled in the art to which the invention pertains. Accordingly, it is intended that the invention be limited only by the spirit and scope of the appended claims.

What is claimed is:

1. In an operations system, an access module for mapping incoming Transaction Language 1 (TL1) protocol messages to Open Systems Interconnection (OSI) protocol messages comprising:

first processing means for parsing each incoming TL1 protocol message to determine the contents of said message;

store means for storing a plurality of data tables each linked relationally to other data tables, at least a first of said data tables representing an autonomous message to event map listing TL1 protocol messages and their corresponding OSI protocol messages and at least a second of said data tables representing a non-autonomous message to directive map listing TL1 protocol messages and their corresponding OSI protocol messages;

second processing means for selecting a corresponding one of said data tables based on the parsed contents of said message and using the data in said selected data table to map said message into a counterpart OSI protocol message;

communications means for interfacing with network elements from which said incoming TL1 messages are output and for providing said incoming TL1 messages to said first processing means; and third processing means for receiving said mapped OSI messages and for encoding said OSI message into an Identifier Length Value (ILV) message to be used in said operations system.

2. The access module of claim 1, wherein said second processing means selects said corresponding data table, if available, from among said plurality of data tables for mapping by determining from the contents of said message at least the type and site of the equipment to which said message relates.

3. The access module of claim 1, wherein said second processing means maps the data from at least the managed object, probable cause, specific problem and event type fields of said at least one data table into corresponding fields of said counterpart OSI message.

4. In a telecommunications network having an operating protocol different from the protocol of a message input thereto, a system for enabling said network to use the contents of said message, comprising:

a communications means for receiving said message;

a first processing means working cooperatively with said communications means for receiving said message and associating said message with at least one object message and its affiliated values having the operating protocol of said network using information based on the operating standards of said network;

a second processing means for receiving and encoding said object message from said first processing means and outputting said object message to said network to be used by other components of said network; and a mapping means further comprising a plurality of data tables each of said data tables being relationally linked to at least one other of said data tables, at least a first of said data tables representing an autonomous message to event map listing messages used outside said network and their corresponding object messages used in said network, said outside messages having an operating protocol that is different from the operating protocol of said object messages, at least a second of said data tables representing a non-autonomous message to directive map listing messages used outside said network and their corresponding object messages used in said network, said outside messages having an operating protocol that is different from the operating protocol of said object messages.

5. The system of claim 4, wherein said mapping means further comprises:

at least another of said tables representing a map having a plurality of values correspondingly related to the object messages of either or both of said first and second tables.

6. The system of claim 5, wherein the operating protocol of said object messages is an Open Systems Interconection (OSI) protocol.

7. The system of claim 4, further comprising:

buffer means for storing object messages output from said second processing means; and at least one function module working cooperatively with said buffer means for outputting said object message for use by said network.

8. The system of claim 4, further comprising:

a management information base (MIB) store for storing resources or information retrievable by said mapping means for associating messages received by said first processing means that have a protocol that differs from the protocol used in said network.

9. The system of claim 4, wherein said message being transmitted to said first processing means is a message identifying a fault in a Transaction Language 1 (TL1) protocol; and wherein said object message comprises attributes and values related to said TL1 message and functions to indicate an alarm representative of said fault in said network operating under an Identifier Length Value (ILV) protocol.

* * * * *